(12) United States Patent
Solomon et al.

(10) Patent No.: US 6,941,427 B2
(45) Date of Patent: Sep. 6, 2005

(54) METHOD AND APPARATUS FOR IMPROVING QUEUE TRAVERSAL TIME

(75) Inventors: Richard L. Solomon, Colorado Springs, CO (US); Jill A. Thomas, Monument, CO (US); Robert E. Ward, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 292 days.

(21) Appl. No.: 10/324,969

(22) Filed: Dec. 20, 2002

(65) Prior Publication Data

US 2004/0123055 A1 Jun. 24, 2004

(51) Int. Cl.[7] ............................................... G06F 12/00
(52) U.S. Cl. ............................. 711/156; 710/5; 710/56
(58) Field of Search ..................... 711/156; 710/5–6, 710/52–58, 65, 100, 310–311; 712/56

(56) References Cited

U.S. PATENT DOCUMENTS

| | | | | |
|---|---|---|---|---|
| 5,696,910 A | * | 12/1997 | Pawlowski | 710/100 |
| 5,778,245 A | * | 7/1998 | Papworth et al. | 712/23 |
| 5,815,649 A | * | 9/1998 | Utter et al. | 714/6 |
| 5,905,905 A | * | 5/1999 | Dailey et al. | 710/5 |
| 6,029,205 A | * | 2/2000 | Alferness et al. | 719/310 |
| 6,032,207 A | * | 2/2000 | Wilson | 710/54 |
| 6,178,497 B1 | * | 1/2001 | Frederick et al. | 712/214 |
| 6,341,301 B1 | * | 1/2002 | Hagan | 718/100 |
| 6,425,034 B1 | * | 7/2002 | Steinmetz et al. | 710/305 |
| 6,658,357 B2 | * | 12/2003 | Chandler | 702/21 |
| 6,745,266 B1 | * | 6/2004 | Johnson et al. | 710/65 |
| 6,760,830 B2 | * | 7/2004 | Inoue et al. | 711/220 |
| 6,789,133 B1 | * | 9/2004 | Crandall et al. | 710/5 |
| 6,820,086 B1 | * | 11/2004 | Iacobovici et al. | 707/100 |
| 2003/0131173 A1 | * | 7/2003 | Cassidy | 710/308 |

* cited by examiner

Primary Examiner—Nasser Moazzami
(74) Attorney, Agent, or Firm—Suiter West Swantz PC LLO

(57) ABSTRACT

A method and apparatus for traversing a queue of commands through part or all of the queue by selecting only the commands that need to be reissued. Commands to be reissued are labeled or designated as valid. The method may be practiced by setting a next valid address pointer in all queue entries. Queue traversal may be forward, backward, or bi-directional.

2 Claims, 8 Drawing Sheets

METHOD AND APPARATUS FOR IMPROVING QUEUE TRAVERSAL TIME

FIELD OF THE INVENTION

The present invention generally relates to the field of processing a queue, and particularly to a method and apparatus for traversing a queue of commands.

BACKGROUND OF THE INVENTION

A host interface that connects to a bus, such as a Peripheral Component Interconnect (PCI) bus, may include a core. The core manages control circuitry responsible for data transfer to and from a device, such as a storage device, coupled to the bus. Data transfer and other commands may be placed in a queue. Commands contained within the queue entry may be skipped or ignored or may fail during processing. When a command is not successfully processed, a validity flag is associated with the queue entry. As processing continues, the core advances from one queue entry to the next, checking the validity flag to determine if the command needs to be reissued. Processing time is easily wasted if there are relatively few commands to be reissued. For example, in a worst-case scenario, the first and last of N queue entries may be the only valid entries, so the core would have to traverse N-2 invalid queue entries to reissue the two commands.

Two prior art solutions have attempted to solve the problem of completed entries intermixed with uncompleted entries in the queue. The first solution, in-order linear traversal of the queue, requires time to process each completed entry and determine if that entry should be skipped. The second solution, Head of List Alternation with a First In First Out memory, is only able to process two entries at a time and absorb completed entries one or two at a time.

Therefore, it would be desirable to provide a more efficient queue traversal method.

SUMMARY OF THE INVENTION

Accordingly, the present invention is directed to a method and apparatus for traversing a queue to reissue commands in which only the queue locations (i.e., addresses) of those commands in need of reissue are accessed and the remainder skipped.

In a first aspect of the present invention, a method for traversing a queue of commands includes the steps of determining valid entries in a queue of commands and addressing only the valid entries traversing through the queue of commands. A valid entry contains a command that needs to be reissued.

In a second aspect of the present invention, a system for traversing a queue of commands includes a processor that issues commands from a queue of commands, a memory coupled to the processor, and a device that performs at least one operation in response to the receipt and interpretation of one of the commands issued from the processor. The commands are issued by the processor in successive order from the queue. The processor reissues commands that are not properly completed. The processor does not address entries of the queue where the queue entries do not contain a command that is to be reissued.

In one embodiment of the present invention, each queue entry automatically maintains a constantly updating pointer to the next valid queue entry. In this manner, the core can simply load its queue pointer with the current entry's pointer. Thus, traversal of M commands requires the same time regardless of the commands' locations in the queue. That is, queue traversal time is related only to the number of valid entries in the queue rather than the size of the queue.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention relates to a method and apparatus for traversing a queue of commands. The queue of commands may include entries for completed commands, interrupted commands, null commands, yet-to-be-completed commands, and the like. The non-completed commands are assigned a tag (i.e., a validity flag) indicating that these commands are valid for reissue. In a preferred embodiment, the method never processes an invalid command. Completed commands, null commands, commands that have been discarded by the controller, and the like are assigned a tag indicating these commands are invalid for reissue. The method may employ a next valid address pointer or may collect the valid command queue positions in a list of adjacent entries to provide a more rapid access to the commands to reissue. In a preferred embodiment, all next valid address pointers may be updated in parallel by independent logic without the need for a processor to handle next valid address pointer management. No direct interaction may be required between queue processing logic and next valid address logic. That is, when queue processing logic clears an entry's valid flag, all queue entries are updated. Although the disclosure is particular to a queue of commands any queue in which entries may not be completed in order may benefit from the method and apparatus of the present invention.

The core maintains a circular (or linear) buffer (or queue) of commands to process. In an embodiment, new commands are always added in order to the logical end of the buffer. Each command entry contains information including whether it is a read or write command and whether the entry is valid. In order to maintain performance, the core will sometimes advance past an uncompleted command to issue a subsequent command. If the subsequent command is completed, there may be a valid command in the queue, followed by one or more invalid commands, and another valid command. If valid commands need to be reissued, the queue (or portions of it) must be re-traversed.

Figure 1:
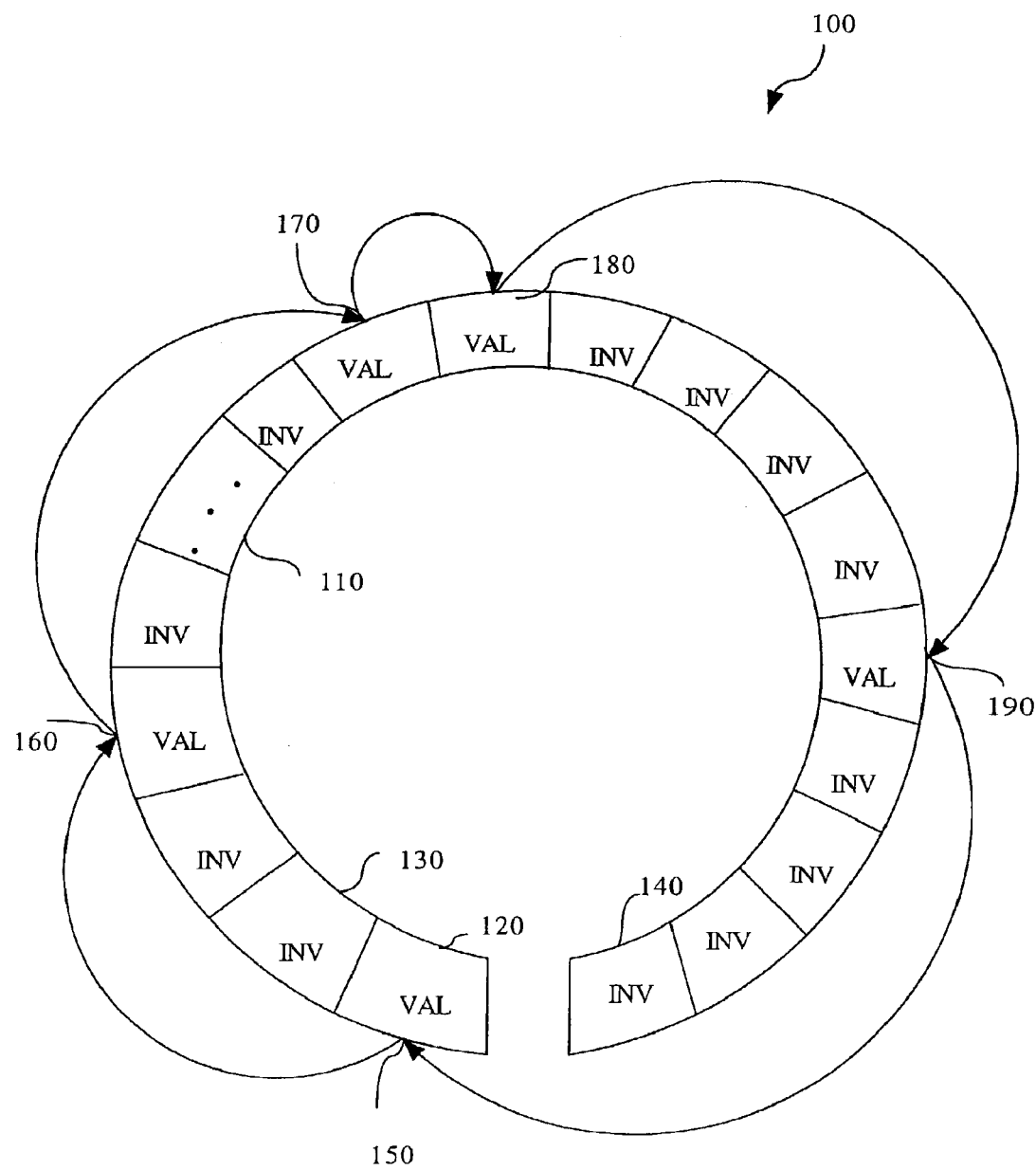
FIG. 1 illustrates an exemplary diagram of the method of the present invention.

FIG. 1 illustrates a diagram of the use of the method of the present invention. A circular queue 110 contains entries. Alternatively, the queue may be a linear queue. Each entry stores a command, but may store data or another type of instruction. Preferably, the command is either a read or write command. As shown in FIG. 1, the entries having valid addresses point to a successor entry having a valid address. Entries not having a valid address are effectively skipped in a processing phase of the present invention. An initial valid entry 120 has associated information that points to the next location having a valid entry 160. Similarly, valid entries 170, 180, and 190 are referenced by an immediately prior valid entry. The last valid entry 190 points to the first valid entry 120. Table I shows an implementation of the method in which invalid entries also point to the next valid entry. This implementation offers advantages if the processor were to erroneously access an entry that is not valid. In that case, the processor would skip to the next valid entry as indicated by the information associated with the entry that is not valid. By the nature of the automatic updating, every entry contains a correct next valid address value, regardless of the entry's validity.

TABLE I

| Queue Entry | Valid Flag | Command | Next Valid Address Pointer |
|---|---|---|---|
| 0 | YES | READ A | 7 |
| 1 | NO | N/A | 7 |
| 2 | NO | N/A | 7 |
| 3 | NO | N/A | 7 |
| 4 | NO | N/A | 7 |
| 5 | NO | N/A | 7 |
| 6 | NO | N/A | 7 |
| 7 | YES | READ B | 0 |

Although the valid (or validity) flag has been described as being part of the queue entry, the valid flag may be stored in another kind of data structure, such as a separate array. The value of the valid flag may be numeric (e.g., binary) or logical (e.g., TRUE or FALSE). Similarly, the Next Valid Address Pointer values may be stored in a separate array.

Figure 2:
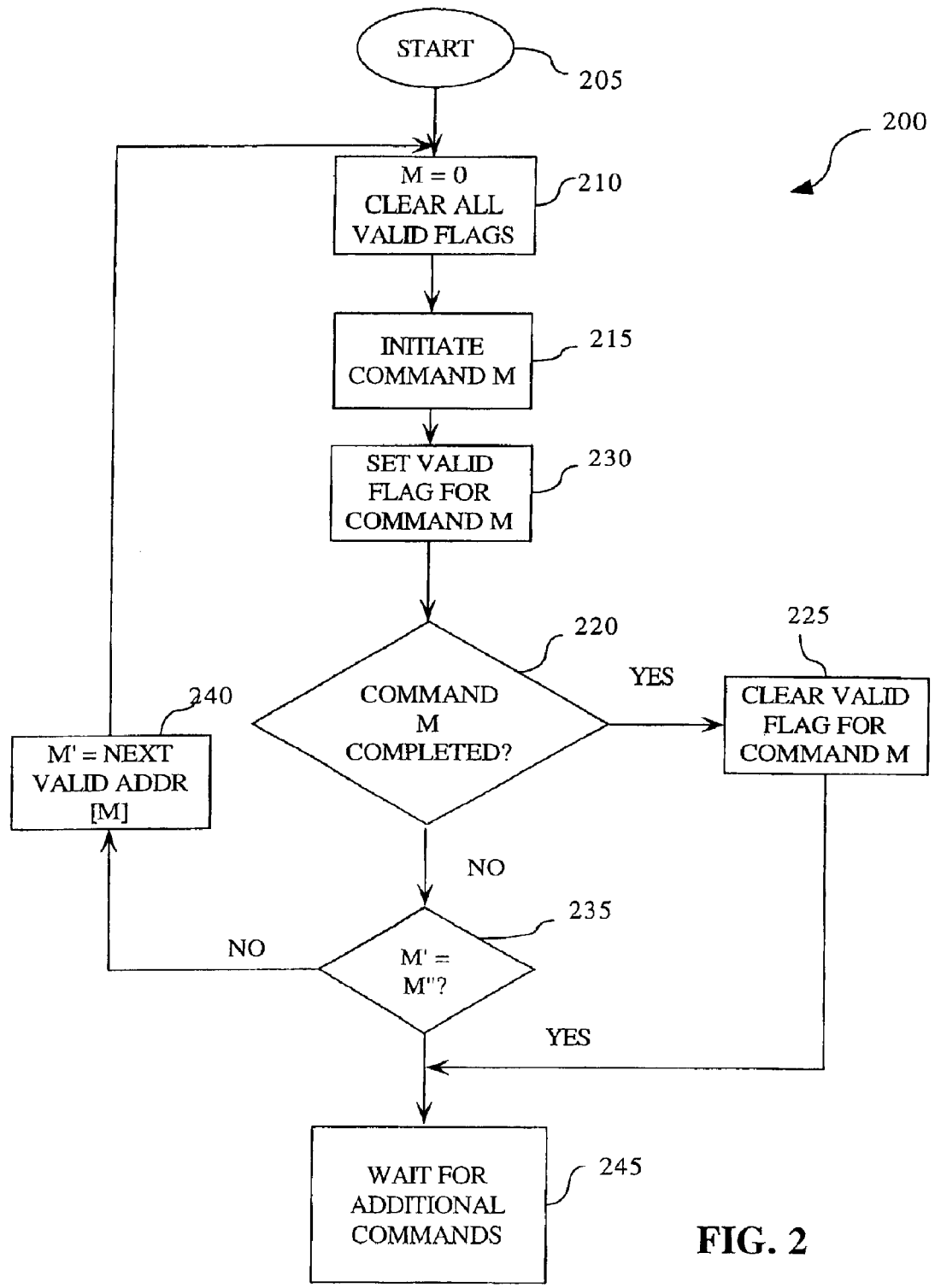
FIG. 2 illustrates an embodiment of a method of present invention for determining which commands are to be reissued.

FIG. 2 illustrates a flowchart of method steps in the preferred embodiment of the present invention. The valid flag is cleared or reset, signifying that there is no command that needs to be reissued. The first command is issued 210, 215. A valid flag is initially set 230. If the command is completed by the controlled device 220, a valid flag for that entry is cleared 225. Having step 230 precede step 220 is especially useful when multiple agents may access the command queue. If there are more valid entries in the queue 235, the command from the next valid entry 240 in the queue is issued 215. Otherwise, processing waits for additional commands to be entered in the queue.

Exemplary code for assigning a next valid address, according to the method of FIG. 2, is shown below. In this example, there are eight entries in the queue. An eight-bit status word contains a valid flag bit for each of the entries. The next valid address for each entry is derived from the entire bit pattern of this status word. In a preferred embodiment, the NextValidAddr is calculated independently and in parallel based only on the collection of valid flags. Synthesis constraints ensure the NextValidAddr values are valid before the next clock edge after any valid flag changes. Hardware and/or software process logic ensures that the current queue pointer is not updated until that time. Each entry's next valid address may be generated combinatorially from the valid flags of all entries via a priority scheme, as illustrated below.

```
always @ (Valid) begin
  casex (Valid)
    8'bXXXX_XX1X:      Next Valid Addr0 = 3'h1;
    8'bXXXX_X10X:      NextValid Addr0 = 3'h2;
    8'bXXXX_100X:      NextValidAddr0 = 3'h3;
    8'bXXX1_000X:      NextValidAddr0 = 3'h4;
    8'bXX10_000X:      NextValidAddr0 = 3'h5;
    8'bX100_000X:      NextValidAddr0 = 3'h6;
    8'b1000_000X:      NextValidAddr0 = 3'h7;
    8'b0000_000X:      NextValidAddr0 = 3'h0;
  endcase
end
always @ (Valid) begin
  casex (Valid)
    8'bXXXX_X1XX:      NextValidAddr1 = 3'h2;
    8'bXXXX_10XX:      NextValidAddr1 = 3'h3;
    8'bXXX1_00XX:      NextValidAddr1 = 3'h4;
    8'bXX10_00XX:      NextValidAddr1 = 3'h5;
    8'bX100_00XX:      NextValidAddr1 = 3'h6;
    8'b1000_00XX:      NextValidAddr1 = 3'h7;
    8'b0000_00X1:      NextValidAddr1 = 3'h0;
    8'b0000_00X0:      NextValidAddr1 = 3'h1;
  endcase
end
always @ (Valid) begin
  casex (Valid)
    8'bXXXX_1XXX:      NextValidAddr2 = 3'h3;
    8'bXXX1_0XXX:      NextValidAddr2 = 3'h4;
    8'bXX10_0XXX:      NextValidAddr2 = 3'h5;
    8'bX100_0XXX:      NextValidAddr2 = 3'h6;
    8'b1000_0XXX:      Next Valid Addr2 = 3'h7;
    8'b0000_0XX1:      NextValidAddr2 = 3'h0;
    8'b0000_0X10:      NextValidAddr2 = 3'h1;
    8'b0000_0X00:      NextValidAddr2 = 3'h2;
  endcase
end
always @ (Valid) begin
  casex (Valid)
    8'bXXX1_XXXX:      NextValidAddr3 = 3'h4;
    8'bXX10_XXXX:      NextValidAddr3 = 3'h5;
    8'bX100_XXXX:      NextValidAddr3 = 3'h6;
    8'b1000_XXXX:      NextValidAddr3 = 3'h7;
    8'b0000_XXX1:      NextValidAddr3 = 3'h0;
    8'b0000_XX10:      NextValidAddr3 = 3'h1;
    8'b0000_X100:      NextValidAddr3 = 3'h2;
    8'b0000_X000:      NextValidAddr3 = 3'h3;
  endcase
end
always @ (Valid) begin
  casex (Valid)
    8'bXX1X_XXXX:      NextValidAddr4 = 3'h5;
```

-continued

```
8'bX10X_XXXX:       NextValidAddr4 = 3'h6;
8'b100X_XXXX:       NextValidAddr4 = 3'h7;
8'b000X_XXX1:       NextValidAddr4 = 3'h0;
8'b000X_XX10:       NextValidAddr4 = 3'h1;
8'b000X_X100:       Next ValidAddr4 = 3'h2;
8'b000X_1000:       NextValidAddr4 = 3'h3;
8'b000X_0000:       NextValidAddr4 = 3'h4;
endcase
end
always @ (Valid) begin
casex (Valid)
8'bX1XX_XXXX:       NextValidAddr5 = 3'h6;
8'b10XX_XXXX:       NextValidAddr5 = 3'h7;
8'b00XX_XXX1:       NextValidAddr5 = 3'h0;
8'b00XX_XX10:       NextValidAddr5 = 3'h1;
8'b00XX_X100:       NextValidAddr5 = 3'h2;
8'b00XX_1000:       NextValidAddr5 = 3'h3;
8'b00X1_0000:       NextValidAddr5 = 3'h4;
8'b00X0_0000:       NextValidAddr5 = 3'h5;
endcase
end
always @ (Valid) begin
casex (Valid)
8'b1XXX_XXXX:       NextValidAddr6 = 3'h7;
8'b0XXX_XXX1:       NextValidAddr6 = 3'h0;
8'b0XXX_XX10:       NextValidAddr6 = 3'h1;
8'b0XXX_X100:       NextValidAddr6 = 3'h2;
8'b0XXX_1000:       NextValidAddr6 = 3'h3;
8'b0XX1_0000:       NextValidAddr6 = 3'h4;
8'b0X10_0000:       NextValidAddr6 = 3'h5;
8'b0X00_0000:       NextValidAddr6 = 3'h6;
endcase
end
always @ (Valid) begin
casex (Valid)
8'bXXXX_XXX1:       NextValidAddr7 = 3'h0;
8'bXXXX_XX10:       NextValidAddr7 = 3'h1;
8'bXXXX_X100:       NextValidAddr7 = 3'h2;
8'bXXXX_1000:       NextValidAddr7 = 3'h3;
8'bXXX1_0000:       NextValidAddr7 = 3'h4;
8'bXX10_0000:       NextValidAddr7 = 3'h5;
8'bX100_0000:       NextValidAddr7 = 3'h6;
8'bX000_0000:       NextValidAddr7 = 3'h7;
endcase
end
```

The method of FIG. 2 may be varied. Instead of setting the valid flag 230 before determining the successful completion of a command 220, the valid flag setting step 230 may be performed between the steps 220 and 235. The test of step 230 may be to determine if the end of the queue MMAX has been reached. Step 245 may be a stop or no op command. Step 240 may increment or decrement the queue entry by one.

Figure 3:
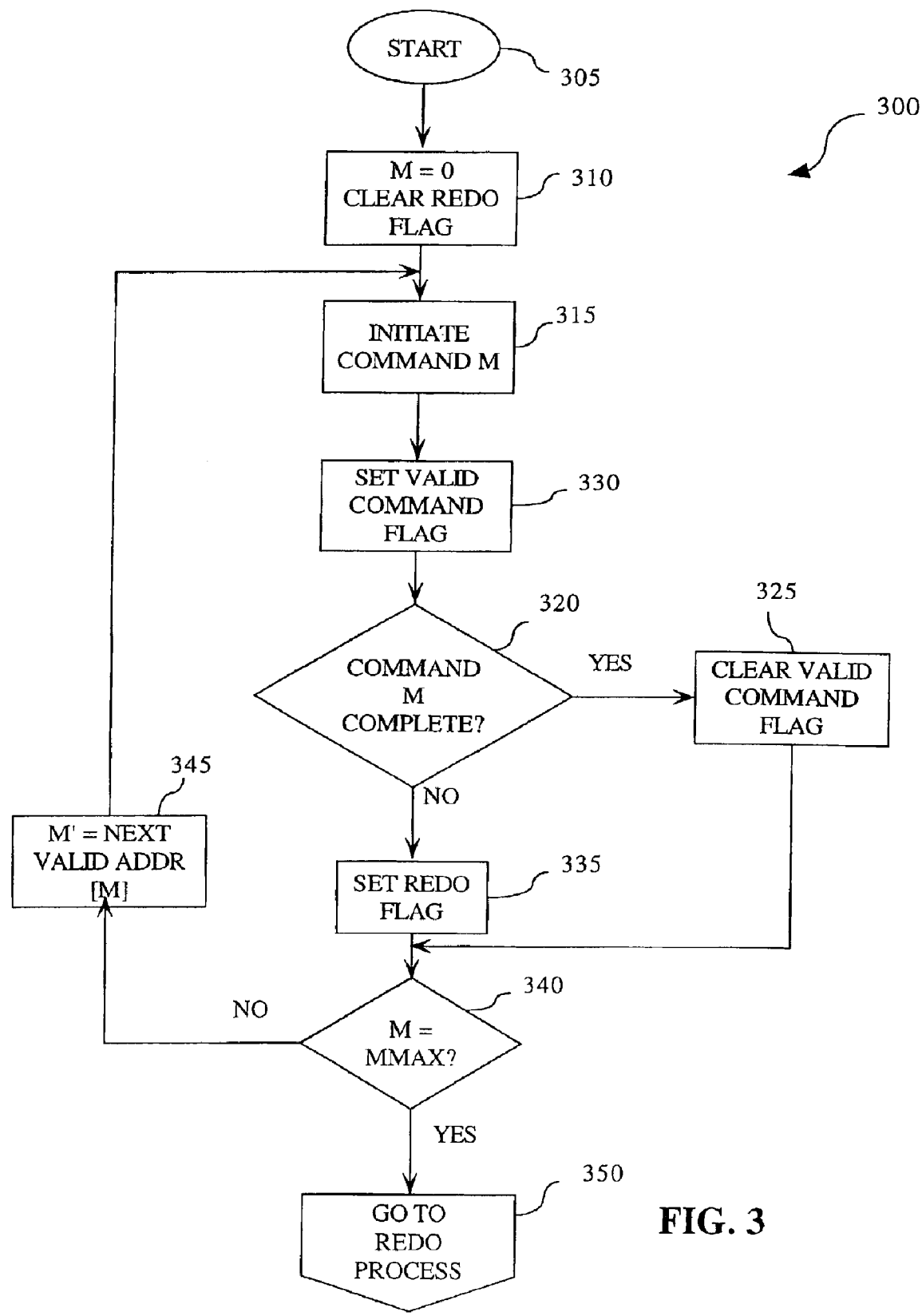
FIG. 3 illustrates an alternate embodiment of the method of the present invention.
Figure 4:
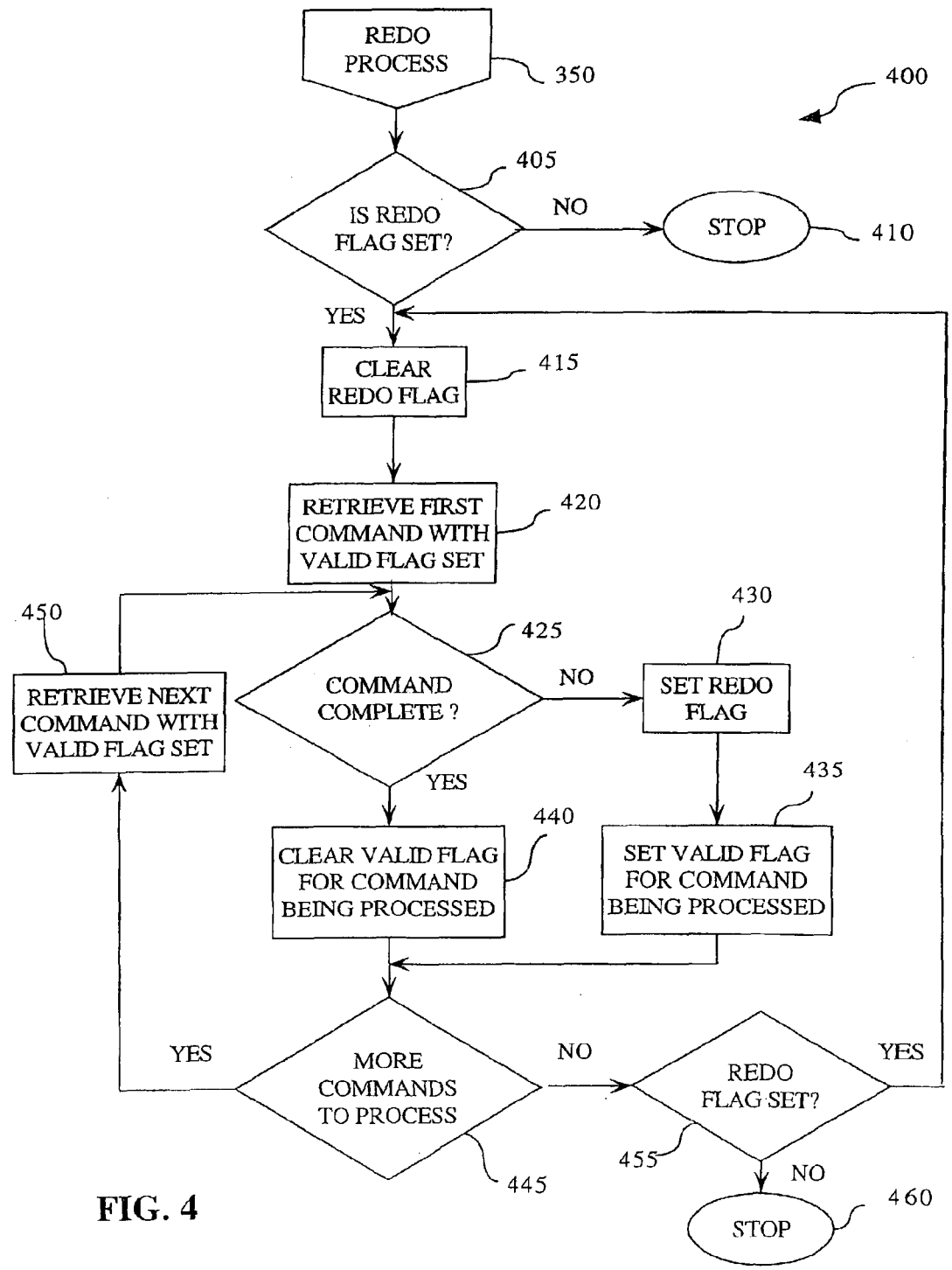
FIG. 4 illustrates an embodiment of the method of the present invention for processing reissued commands.
Figure 5:
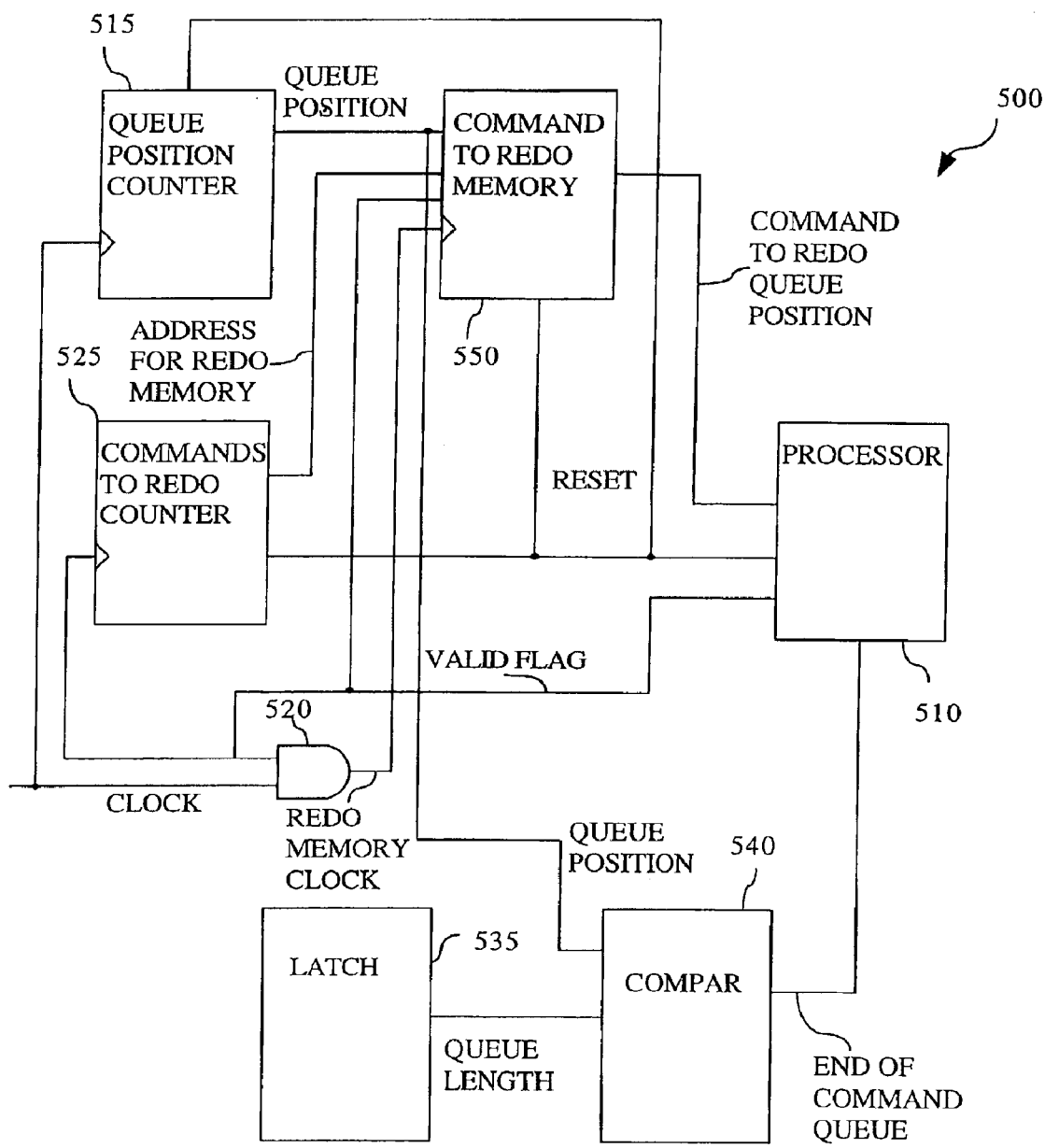
FIG. 5 illustrates an exemplary embodiment of an apparatus of the present invention.

FIGS. 3–5 describe alternative embodiments of the present invention. FIG. 3 illustrates an alternative embodiment of the method for traversing a queue of the present invention. In this embodiment, a redo flag is set 330 if any issued valid command has not been completed or otherwise fails. If the redo flag is set at the end of the processing of the queue commands, a second phase commences in which the failed commands are reissued.

As shown in FIG. 4, in the second (or redo phase) 350, the redo flag is checked 405. If it is not set, the second phase is stopped 410. If the redo flag is currently set, a new phase commences. The redo flag is cleared 415. The first command with a valid flag set is then retrieved and reissued. If the command does not complete or fails 425, the redo flag is set again 430 and the valid flag remains set 435. Otherwise, the valid flag for the queue entry corresponding to the command is cleared 440. If there are more commands to be reissued in this stage 445, the next command to be reissued is retrieved and reissued 450. Otherwise, if the redo flag is still set 455, a third stage commences for the commands that still have valid flag entries. A limit may be placed on the number of redo stages for a queue to avoid system hang-ups. For example, a counter may be employed to count the number of stages per queue. If a threshold is reached, the processor issues an alert to an operator, enacts a bypass procedure, or performs other operations. A counter threshold may be hardwired or presettable by the processor, either automatically or through operator entry.

Figure 6:
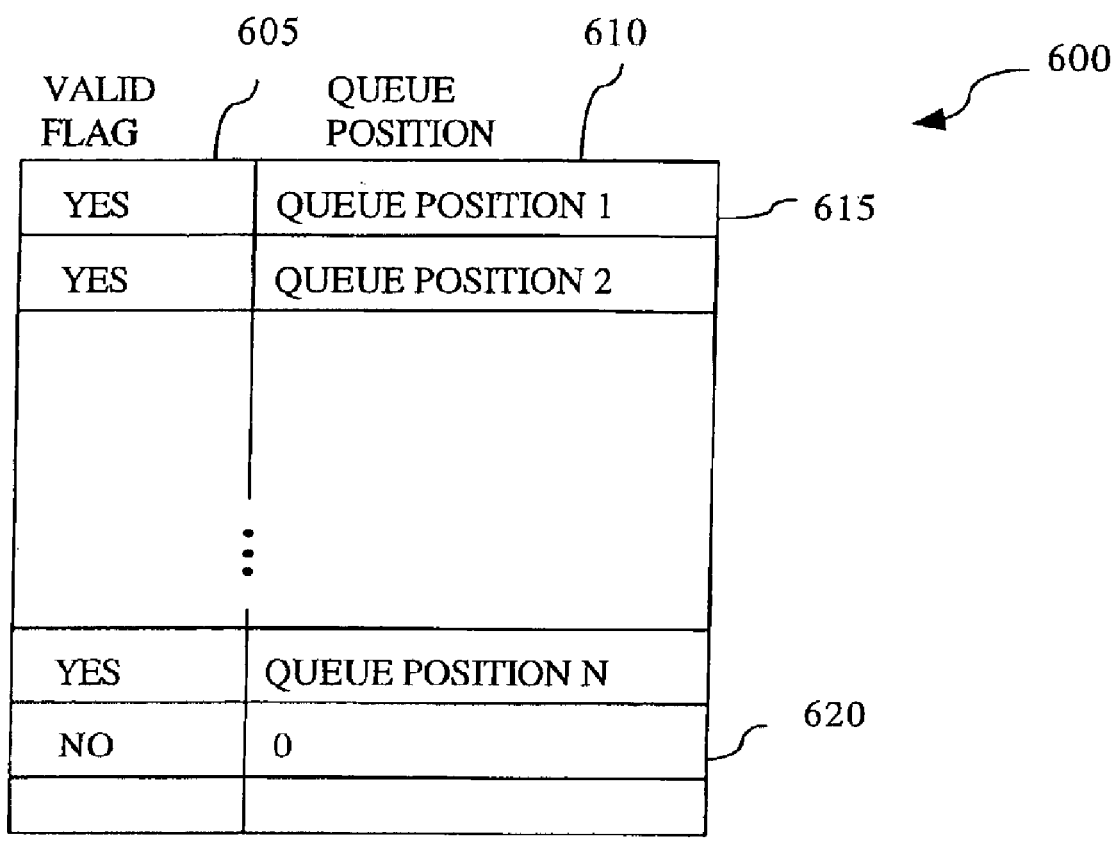
FIG. 6 illustrates an example of valid command entries in a memory in an embodiment of the present invention in accordance with FIG. 5.

All or part of the processing of this method may be enacted through hardware. An exemplary circuit for performing the method is generally shown in FIG. 5. Other variations are within the spirit and scope of the invention. The processor 510 controls circuitry that creates a list of queue entries having commands to be reissued or otherwise processed. The command to redo memory 550 stores these queue entries by location or address in a successive order. For example, if the third, tenth, and twentieth entries were determined to contain commands to be reissued, then memory 550 would store as a first entry the number 3, as second entry the number 10, and as a third entry the number 20. This scheme is illustrated in FIG. 6. A memory space contains valid entries 615 stored in succession. The remainder 620 of the memory space may store an end-of-queue character and/or may be demarked by the clearing of the valid flag. Returning to FIG. 5, a clock corresponding to a new queue entry drives a counter 515 that provides the queue entry position to the redo memory 550. This clock also causes the memory to store queue position counter data in accordance with the valid data (or command reissue) flag from the processor 510. The address of the commands in the redo memory are determined by the redo counter that is clocked by the valid flag from the processor. A comparator 540 may be employed to indicate to the processor 510 when the end of the queue has been reached. The threshold for the comparator may be stored in a latch 535. This exemplary circuit is meant for a single redo stage. Other variations in hardware are contemplated in which multiple redo stages may be performed as needed.

Figure 7:
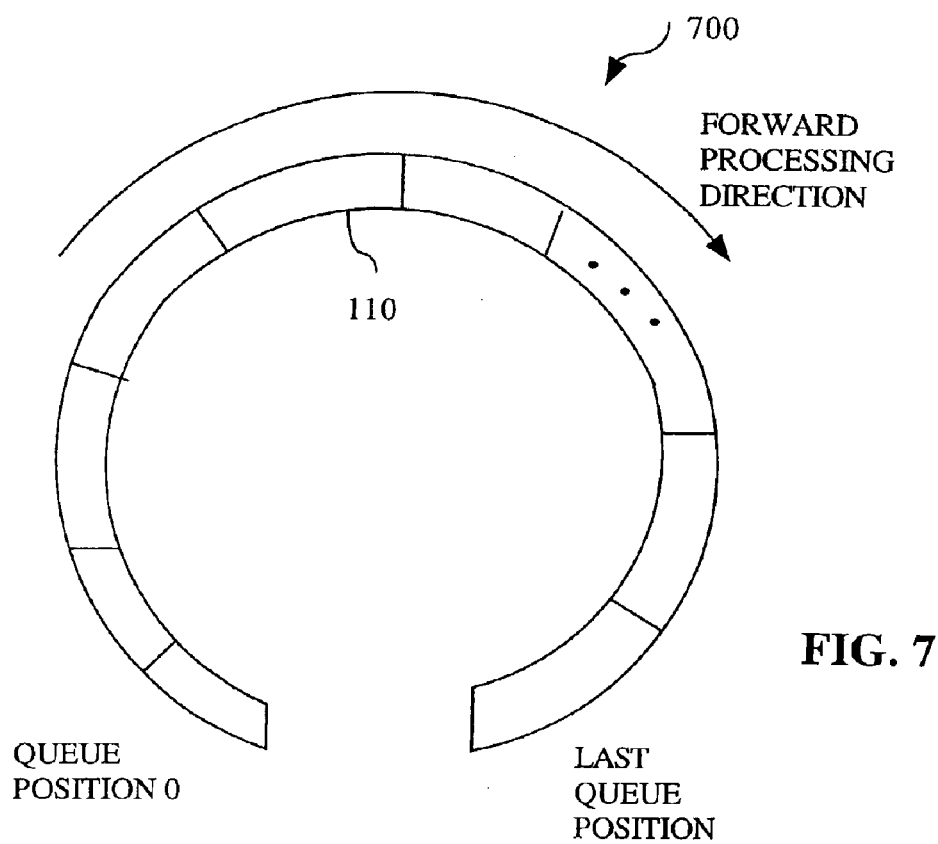
FIG. 7 illustrates a forward traversal of a circular queue in an embodiment of the method of the present invention.
Figure 8:
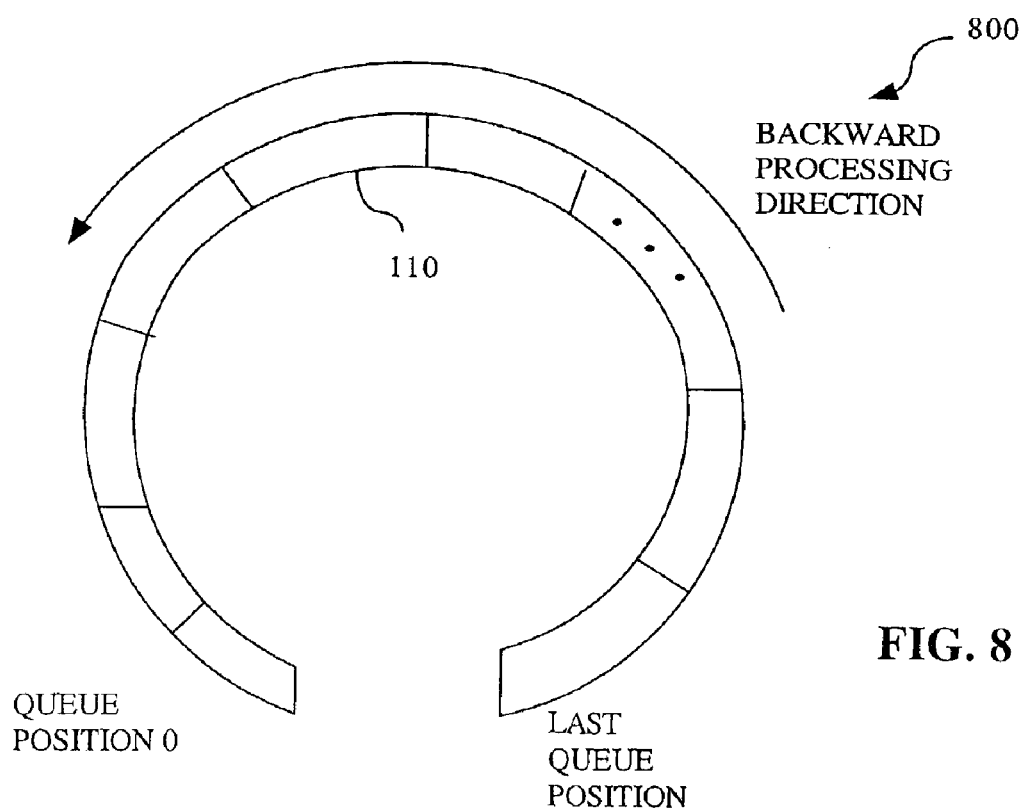
FIG. 8 illustrates a backward traversal of a circular queue in an embodiment of the method of the present invention.
Figures 9, 10:
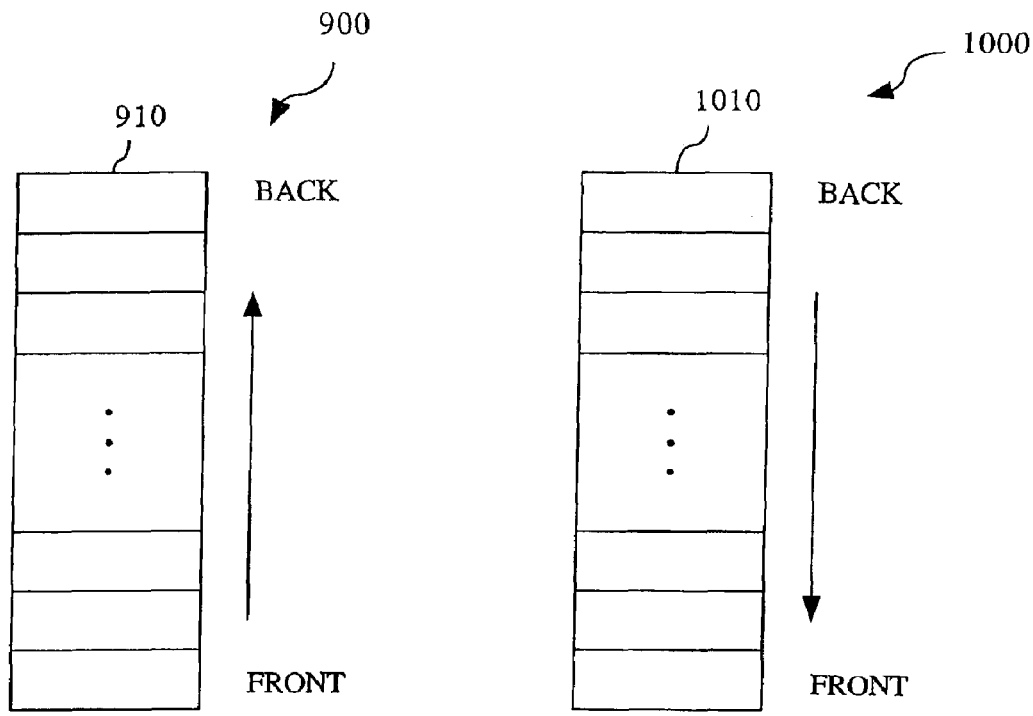
FIG. 9 illustrates a forward traversal of a linear queue in an embodiment of the method of the present invention.
FIG. 10 illustrates a backward traversal of a linear queue in an embodiment of the method of the present invention.

FIGS. 7–10 illustrate various queue traversal schemes. FIGS. 7 and 8 show circular queues traversed in a forward direction and a backward direction, respectively. Similarly, FIGS. 9 and 10 show linear queues traversed in a forward direction and a backward direction. The method of the present invention may be adapted to permit traversal of a queue in either direction or in alternating directions. If the queue were traversed in alternating directions, the number of entries traversed per cycle may be independently settable for the forward direction and the backward direction. Partial queue traversals and traversals over only a portion of a queue are contemplated by the method of the present invention. Using the preferred embodiment of the method of FIG. 2, two pointers, NextValidAddr and PreviousValidAddr, may need to be maintained per queue entry to accommodate bi-directional traversal.

Figure 11:
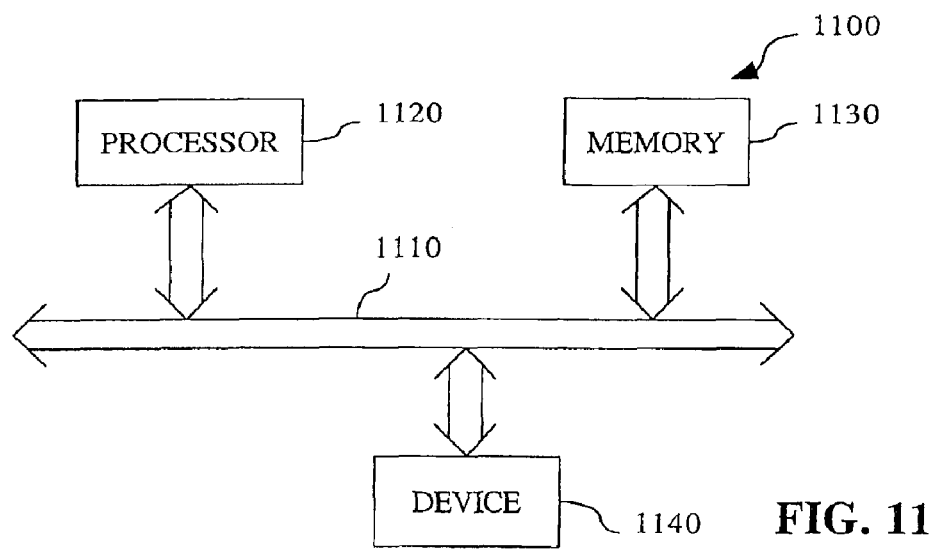
FIG. 11 illustrates an exemplary system that uses the present invention.

FIG. 11 illustrates a functional block diagram of an embodiment of a system of the present invention that uses a processor. The device 1140 performs operations in accordance with the queue commands. The processor 1120 controls the issuance of the commands and executes instructions to implement the traversal method of the present invention. The processor 1120 and the device 1140 are coupled to each other and to a memory 1130 through a bus 1110. The bus may be a Peripheral Component Interface Extended (PCI-X) bus or other suitable bus. The processor 1120 may be a PCI-X core. The device may be a redundant array of disks subsystem, another form of storage device, and the like.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. Features of any of the variously described embodiments may be used in other embodiments. The form herein before described being merely an explanatory embodiment thereof. It is the intention of the following claims to encompass and include such changes.

What is claimed is:

1. A method for traversing a queue, comprising:

issuing a command;

determining if the command needs to be reissued;

clearing a validity flag for the command if the command does not need to be reissued;

determining the location of the next command to be reissued; and associating the location of the next command to be reissued with the command that needs to be reissued, wherein the command that needs to be reissued and the next command to be reissued are stored in a queue;

in parallel with the clearing step, updating the queue whereby a current valid address pointer is maintained in each entry of the queue, wherein the queue is updated by a next valid address logic which is independent from a queue processing logic, wherein each entry in the queue includes a valid address pointer to a successor entry which has a valid address, wherein a next valid address pointer for each entry of the queue of commands is calculated by the next valid address logic.

2. A method or traversing a queue, comprising:

determining if an entry in the queue needs to be accessed, wherein each entry in the queue includes a valid address pointer to a successor entry which has a valid address;

setting a validity flag to a first state for the entry if the command needs to be accessed, otherwise setting the validity flag to a second state for the entry;

determining the location of the next queue entry to be accessed;

associating the location of the next queue entry to be accessed with the entry that needs to be accessed; and updating the queue whereby a current valid address pointer is maintained in each entry of the queue of commands, wherein the queue is updated by a next valid address logic which is independent from a queue processing logic, wherein a next valid address pointer for each entry of the queue is calculated by the next valid address logic.

* * * * *